US012540866B2

(12) United States Patent
Zhang et al.

(10) Patent No.: US 12,540,866 B2
(45) Date of Patent: Feb. 3, 2026

(54) FIBER OPTIC BASED TEMPERATURE SENSOR

(71) Applicants: Qin Zhang, San Jose, CA (US); Eric Kanki, San Jose, CA (US)

(72) Inventors: Qin Zhang, San Jose, CA (US); Eric Kanki, San Jose, CA (US)

(73) Assignee: Lambdascope, San Jose, CA (US)

(*) Notice: Subject to any disclaimer, the term of this patent is extended or adjusted under 35 U.S.C. 154(b) by 381 days.

(21) Appl. No.: 18/197,708

(22) Filed: May 15, 2023

(65) Prior Publication Data

US 2024/0385057 A1    Nov. 21, 2024

(51) Int. Cl.
G01K 11/32 (2021.01)
H01S 5/042 (2006.01)

(52) U.S. Cl.
CPC ............ *G01K 11/32* (2013.01); *H01S 5/0428* (2013.01)

(58) Field of Classification Search
CPC ............................. G01K 11/32; H01S 5/0428
See application file for complete search history.

(56) References Cited

U.S. PATENT DOCUMENTS

| 5,028,146 A * | 7/1991 | Wada | G01K 11/32 374/161 |
| 10,845,221 B2 * | 11/2020 | Morel | G01M 11/319 |
| 12,123,800 B2 * | 10/2024 | Wohlfeil | H01S 5/06837 |

* cited by examiner

Primary Examiner — Tony Ko
(74) Attorney, Agent, or Firm — Taboada Law Firm, PLLC; John M. Taboada

(57) ABSTRACT

A novel detection scheme and all fiber optic temperature sensor is disclosed. The apparatus comprising a sensing loop; a laser diode driver; a coupler; a first photodetector coupled to the coupler output to produce a current; an amplifier to convert and amplify the current to voltage; an A/D converter to convert the voltage to digital signal; an AOEO regenerator to convert coupler optical output to electronic signal while preserving timing information and electronic signal to regenerated optical signal; a timer to control AOEO delay time; optical fiber probe; and microcontroller coupled to laser diode driver, A/D converter, and timer; and configured to control first optical signal timing and AOEO delay time; and configured to process digital signal based on its time of flight variation to determine a temperature change, and wherein sensitivity increases with increasing optical fiber length and/or number of regenerated optical signals. Other embodiments are described and claimed.

19 Claims, 13 Drawing Sheets

FIBER OPTIC BASED TEMPERATURE SENSOR

I. BACKGROUND

The present invention pertains to temperature sensors. More particularly, the invention relates to a novel all fiber optic temperature sensor design which meets the demands of industrial applications and is capable of measuring temperature with better than 1° C. accuracy.

II. SUMMARY

In one respect, disclosed is a fiber optic based temperature sensor comprising a sensing loop, the sensing loop comprising: a seed laser diode configured to generate an initial optical pulse; a laser diode driver coupled to the seed laser diode and configured to drive the seed laser diode; a 3 db coupler having a first input, a second input, a first output, and a second output, wherein the seed laser diode is optically coupled to the first input of the 3 db coupler; a first photodetector optically coupled to the first output of the 3 db coupler and configured to detect a first half of an optical output from the 3 db coupler and produce a current based on the detected first half of the optical output from the 3 db coupler; an amplifier coupled to the first photodetector and configured to convert and amplify the current to an output voltage; an A/D converter coupled to the amplifier and configured to convert the output voltage to a digital signal; an analog optical-to-electrical-to-optical (AOEO) regenerator comprising: an optical input having a second photodetector; an optical output having a second laser diode; wherein the optical input of the AOEO is optically coupled to the second output of the 3 db coupler, wherein the AOEO is configured to convert a second half of the optical output from the 3 db coupler to an electronic signal while preserving timing information of the second half of the optical output from the 3 db coupler, and wherein the AOEO is configured to convert the electronic signal to a regenerated optical signal at the optical output; a timer coupled to the AOEO and configured to control a delay time of the AOEO by timely interrupting the electrical signal; an optical fiber probe comprising a length of optical fiber having an optical input and an optical output, wherein the optical input of the optical fiber probe is optically coupled to the optical output of the AOEO and wherein the optical output of the optical fiber probe is optically coupled to the second input of the 3 db coupler; and a microcontroller coupled to the laser diode driver, the A/D converter, and the timer; wherein the microcontroller is configured to control timing of the first optical signal and the delay time of the AOEO triggered by the timer; wherein the microcontroller is configured to process the digital signal based on its time of flight variation to determine a temperature change, and wherein the sensitivity of the fiber optic based temperature sensor increases with an increase in the length of optical fiber of the optical fiber probe and/or an increase in the number of times the regenerated optical signal is generated.

In another respect, disclosed is a fiber optic based temperature sensor comprising a sensing loop, the sensing loop comprising: an optical portion comprising a length of optical fiber having an optical input and an optical output; and an electrical portion, wherein the electrical portion comprises: a laser diode, the laser diode configured to: generate an initial optical pulse and subsequent regenerated optical pulses and launch the initial optical pulse and subsequent regenerated optical pulses into the optical input of the optical portion; a laser diode driver coupled to the laser diode, the laser diode driver configured to drive the laser diode; a photodetector, the photodetector configured to: detect the initial optical pulse and the subsequently regenerated optical pulses which pass through the optical portion and out the optical output of the optical portion and produce an electronic signal based on the detected initial optical pulse and subsequently regenerated optical pulses; a transimpedance amplifier coupled to the photodetector, the transimpedance amplifier configured to amplify the electronic signal; a limiting amplifier coupled to the transimpedance amplifier, the limiting amplifier configured to further amplify the electronic signal; a 1:2 splitter coupled to the limiting amplifier, the 1:2 splitter configured to split the further amplified electronic signal into a first output and a second output; and a microcontroller coupled to the second output of the 1:2 splitter, the laser diode driver, and the limiting amplifier, the microcontroller configured to: process the further amplified electronic signal from the second output of the 1:2 splitter to a digital signal based on its time of flight variation to determine a temperature change; enable and disable the laser diode driver; and enable and disable the further amplification of the electronic signal; wherein the further amplified electronic signal from the first output of the 1:2 splitter is sent to the laser diode driver so subsequent optical pulses may be regenerated by the laser diode; and wherein the sensitivity of the fiber optic based temperature sensor increases with an increase of the optical fiber length and/or in the number of times the regenerated optical pulses are generated.

Numerous additional embodiments are also possible.

III. BRIEF DESCRIPTION OF THE DRAWINGS

Other objects and advantages of the invention may become apparent upon reading the detailed description and upon reference to the accompanying drawings.

Figure 10A:
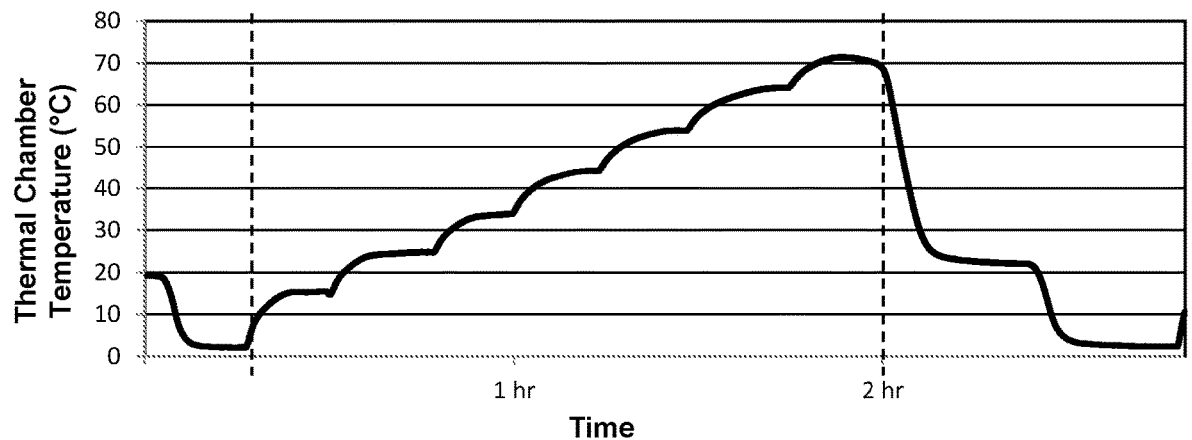

FIGS. 10A and B are graphs showing the temperature profile in a thermal chamber simulating severe temperature variation from 0° C. to 70° C. over a period of two hours and the measured relative target temperature changes in the sensing fiber after compensation for ambient temperature disturbances, respectively, in accordance with some embodiments.

Figure 11:
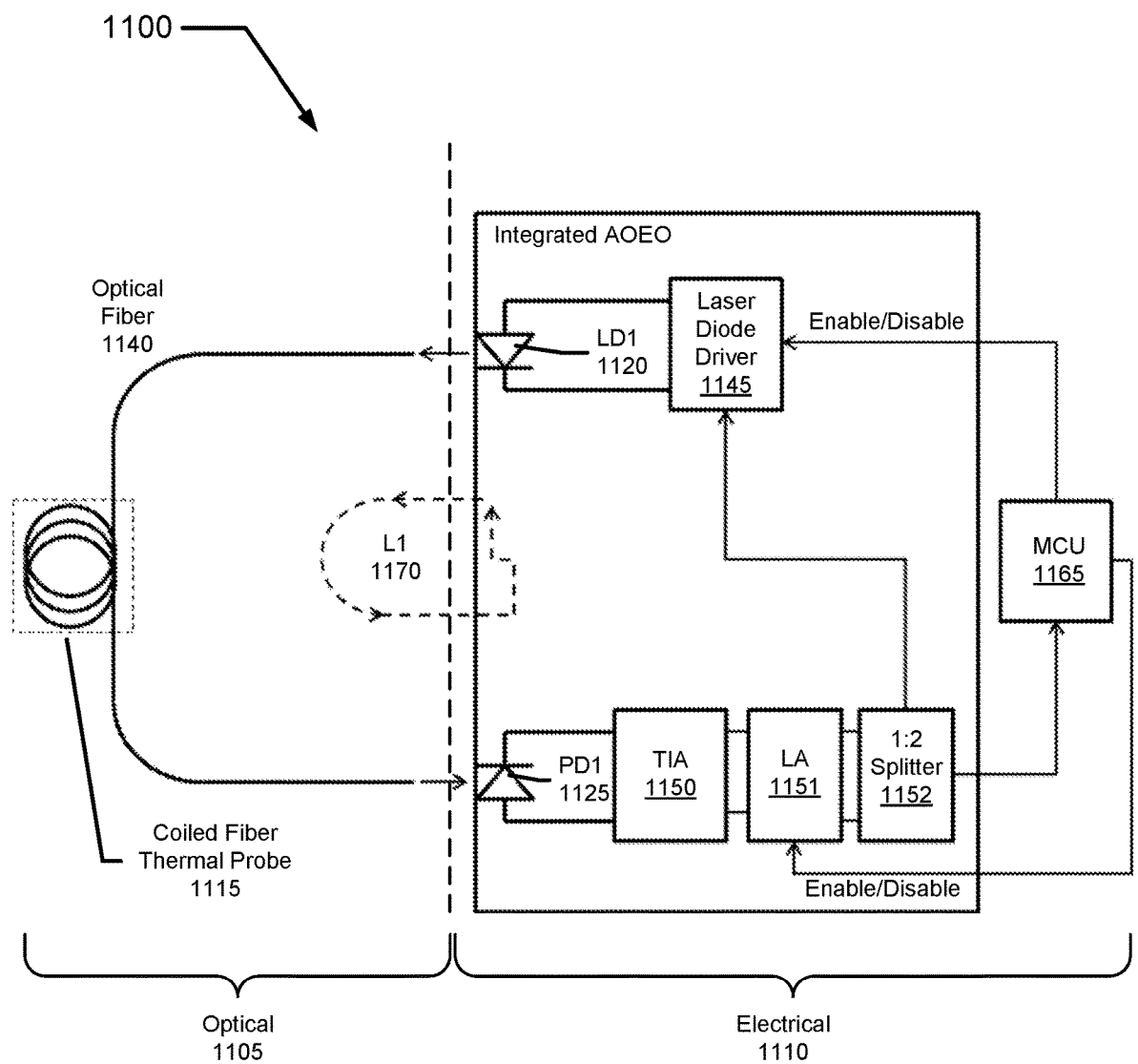

FIG. 11 is a schematic of a fiber optic temperature sensor with integrated AOEO, in accordance with some embodiments.

Figure 12:
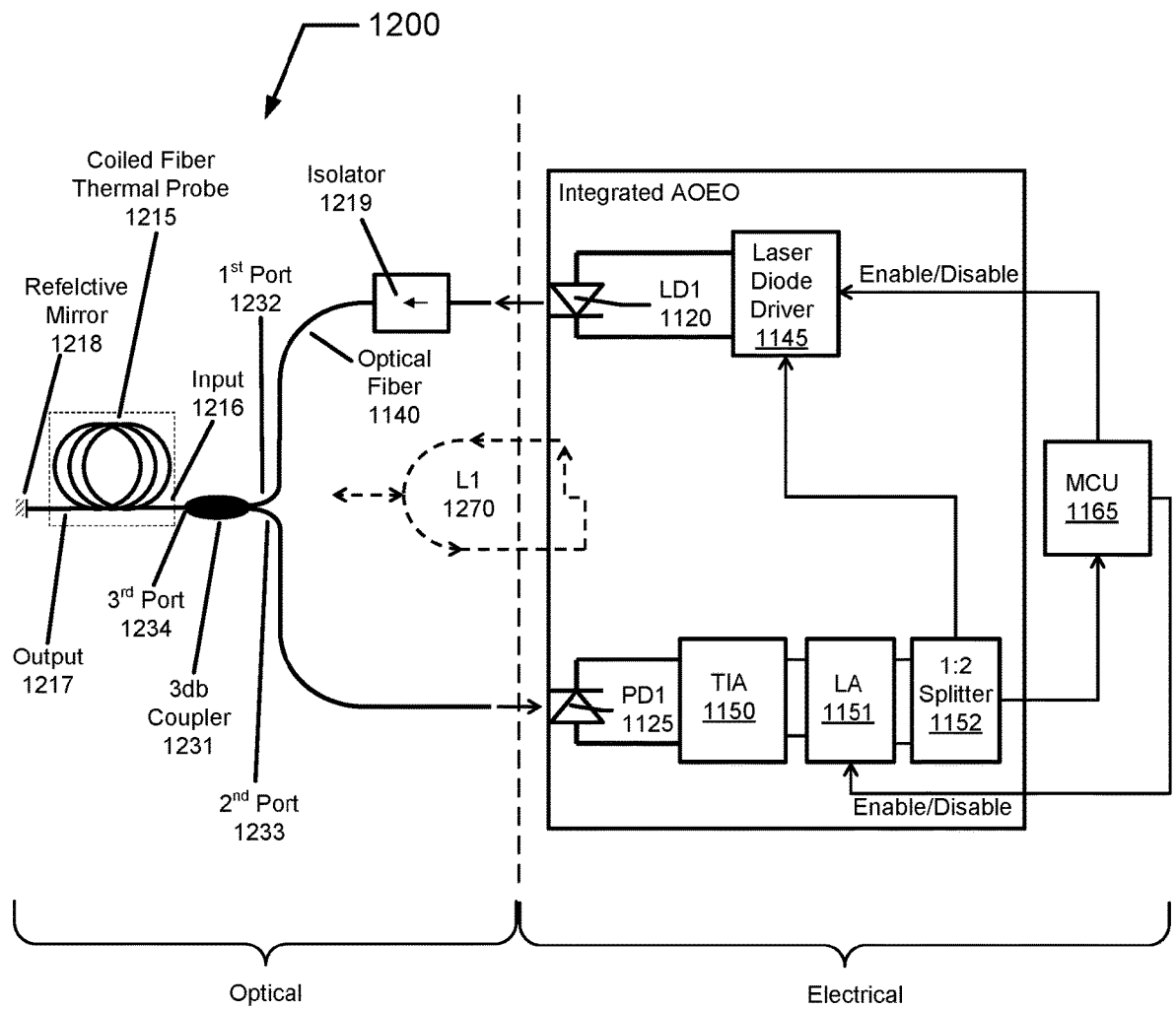

FIG. 12 is a schematic of a fiber optic temperature sensor with integrated AOEO and reflecting mode fiber sensor, in accordance with some embodiments.

Figure 13:
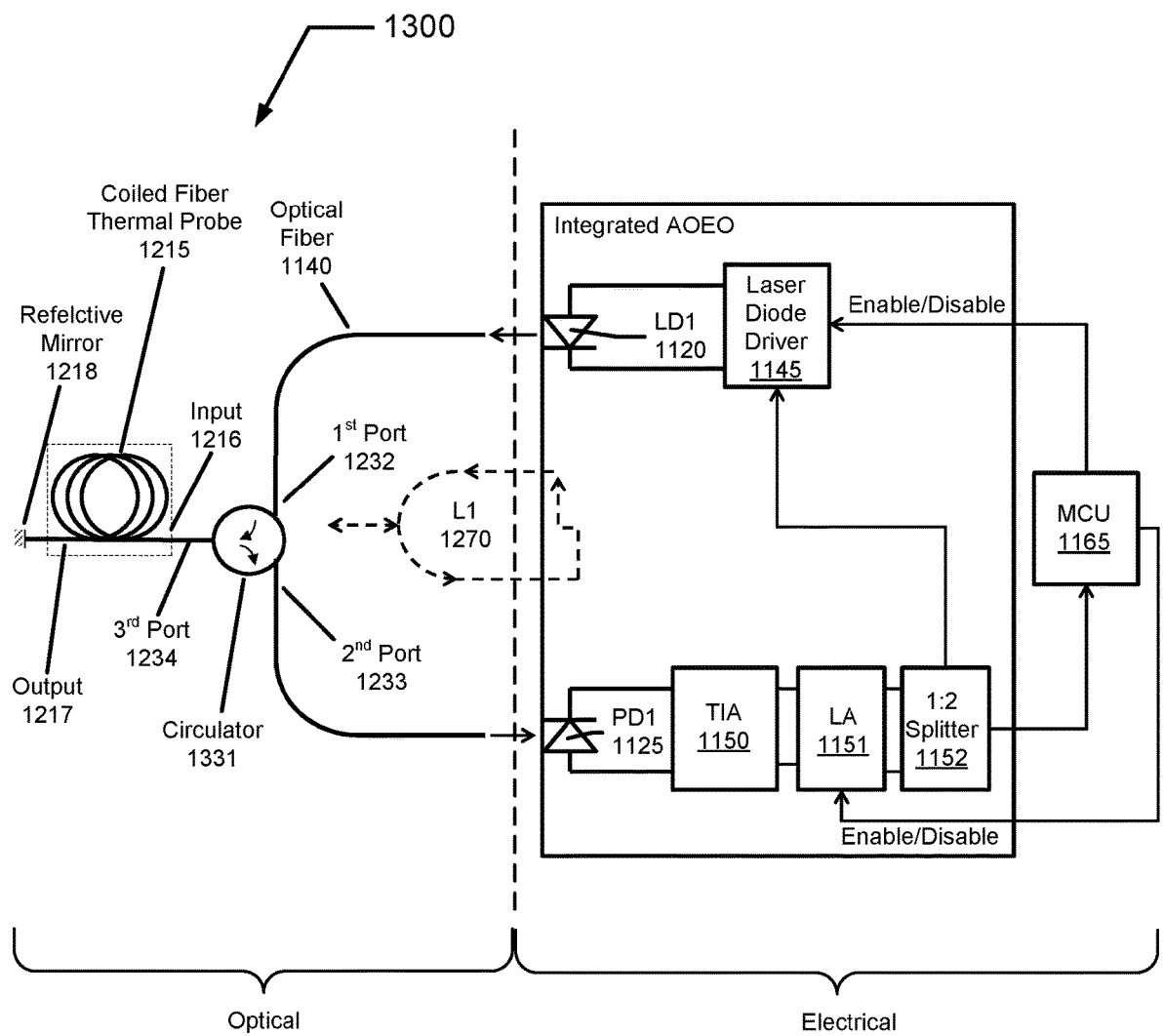

FIG. 13 is a schematic of a fiber optic temperature sensor with integrated AOEO and reflecting mode fiber sensor, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

IV. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

Temperature sensing for industrial and medical applications have very stringent requirements. The field environment often is harsh with strong and even dangerous electromagnetic interference (EMI), which makes conventional thermometers unsuitable. Fiber optic temperature sensors are naturally immune to EMI and thus offer great potential to meet the demand for the stringent industrial applications. For decades, strong efforts have been made to produce reliable fiber optic temperature sensors with limited success. There are a few commercially available products today in this category, but most of devices are based on either the fiber Bragg grating (FBG) technology, stimulated fluorescence detection, or the semiconductor Fabry-Perot (F-P) etalon. While those technologies provided temperature sensitivity with limited success, they met slow adoption for industrial applications because all of them require a complex and expensive spectrum analyzer system in order to interrogate the wavelength shift. The spectrum analyzer may be an excellent choice for measurement under laboratory environment and can provide high precision, but remains unsuitable for harsh industrial applications because of its delicacy and poor reliability. Two examples of such commercial fiber optic temperature sensors are the WaveCapture™ FBG analyzers from Advanced Energy® and the Neoptix T1™ and Neoptix T2™ probes from Qualitrol®.

Thus, a need exists for more reliable and cost effective fiber optic sensing technology. The present invention described herein may solve the aforementioned shortcomings as well as others by proposing a novel detection scheme and all fiber optic temperature sensor with improved reliability and reduced manufacturing cost. The invention is based on the detection of thermal expansion of an optical fiber by measuring the time of flight with greatly enhanced accuracy. The advantage of the disclosed invention offers significant improvement in the accuracy of temperature measurement, in reducing the manufacturing cost and enhancing product reliability in comparison of the commercially available existing technologies.

Figure 1:
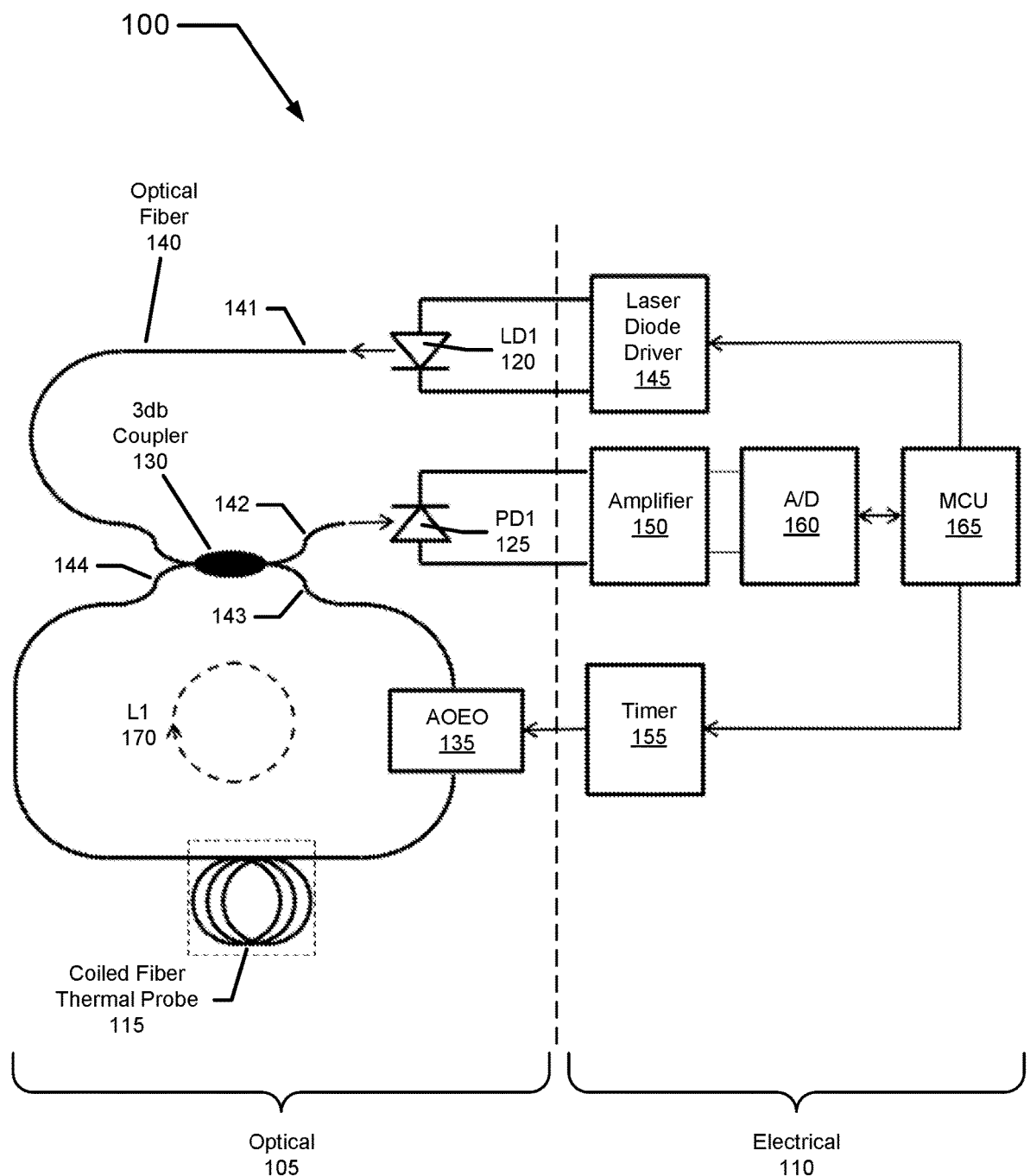
FIG. 1 is a schematic of a fiber optic temperature sensor, in accordance with some embodiments.

FIG. 1 is a schematic of a fiber optic temperature sensor, in accordance with some embodiments.

As illustrated in FIG. 1, the fiber optic based temperature sensor 100 comprises two functional portions: one optical 105 and the other electrical 110 and both configured to interact with each other. The optical functional block comprises a length of optical fiber coiled to form a circularly shaped thermal probe 115, a seed laser diode (LD1) 120, a photodetector (PD1) 125, a 2×2 3 dB fiber coupler 130, and an analog optical-to-electrical-to-optical (AOEO) regenerator 135 and all of which are optically coupled with optical fiber 140. The electrical functional block comprises a laser diode driver 145, photodetector receiving and amplifying circuit 150, time delay function circuit 155, analog to digital (A/D) converter 160 and microcontroller (MCU) 165 for signal timing control and processing.

Figure 2:
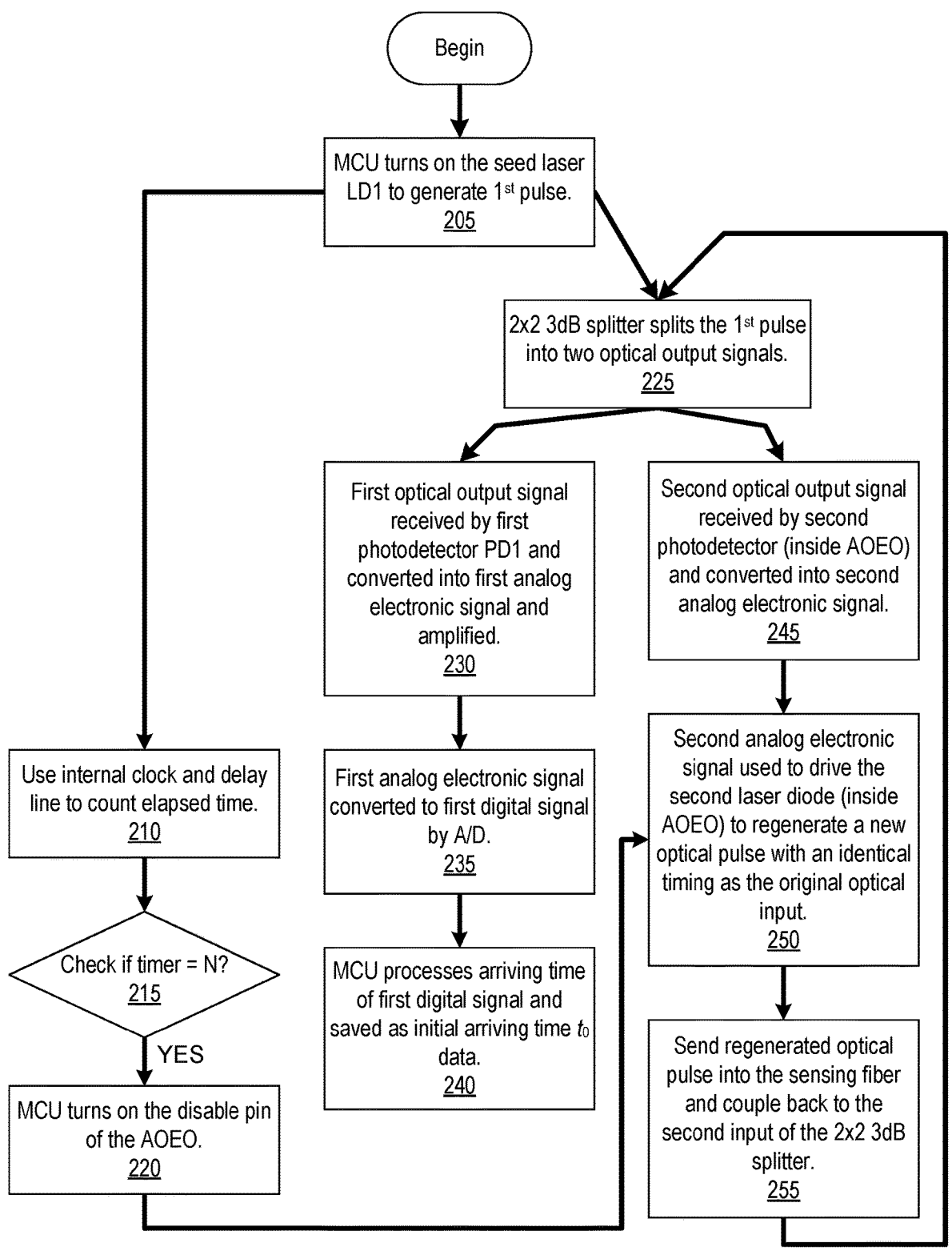
FIG. 2 is a flowchart illustrating the operation process of the fiber optic temperature sensor of FIG. 1, in accordance with some embodiments.

The operation principle is as follows. A single optical pulse $P_0$ is initiated at time $t_0$ from LD1 and split by the 2×2 3 dB coupler with two input and two output two fibers. LD1 is connected to the first input 141 of the 3 dB coupler. Both outputs 142, 143 from the 3 dB coupler each splits the identical 50% of $P_0$ and received by the photodetector PD1 and the AOEO input, respectively. The 50% of $P_0$ received by PD1 is converted by the A/D for information processing by the MCU. This is the signal processing unit. The other 50% of $P_0$ is configured to form a loop (L1) 170. Inside the loop, the signal flows as follows. The 50% $P_0$ pulse split by the 3 dB coupler is received by the AOEO regenerator. The function of the AOEO is to regenerate the optical signal in analog fashion while preserving the signal timing information with minimum delay and jitter disturbance. After the AOEO, it is converted to $P_1$ at time $t_1$ and subsequently delivered to the optical fiber probe 115. Passing through the probe, $P_1$ is looped back and connected to the second input 144 of the 2×2 3 dB coupler where $P_1$ is split into two (as was $P_0$). When the half of $P_1$ enters into the AOEO, it has completed its pass in one full loop $l_1$ and is ready to be regenerated. In the next step after the AOEO, this half of $P_1$ becomes a newly regenerated pulse $P_2$ at a new time $t_2$, and subsequently, the same process would repeat for $P_3$ at $t_3$, $P_4$ at $t_4$, and so on and so forth. Such process may repeat itself by N times when the AOEO is designed properly. If we define the first optical fiber loop path length for the optical pulse $P_1$ as $L_1$, after the $N^{th}$ regeneration, the $N^{th}$ pulse $P_N$ would have experienced a total optical length of $L_N = N \times L_1$ at time $t_N$. While the signal $P_N$ regeneration is going on, the other half of $P_N$ is accessible by the signal process unit. It is being monitored and received concurrently by PD1 and converted by A/D converter at $t_N$ for further signal processing. To describe the process mathematically, let us define the above mentioned optical path length $L_1$ and physical length $l_1$ of the optical fiber as in the following equation:

$$L_1 = n * l_1 \qquad \text{(Equation 1)}$$

where n is the refractive index of the fiber (approximately 1.46). The change in the optical length as a function of the thermal expansion at temperature T can be expressed as:

$$\frac{dL_1}{dT} = l_1\left(n\alpha + \frac{dn}{dT}\right) \quad \text{(Equation 2)}$$

where α is the thermal expansion coefficient of the fiber glass, which is typically $0.5\times10^{-6}/°$ C., and dn/dT approximately $1.5\times10^{-6}/°$ C. It is well-known that both the thermal expansion and refractive index change approximately linearly as a function of temperature in most practical scenarios. From Equation 2, for $l_1=100$ m and $dL_1/dT=2.23\times10^{-4}$ m/° C., it can be estimated that the minimum requirement becomes $2.23\times10^{-4}$ m/° C. in order for a fiber optic temperature sensor to resolve one degree Celsius. To achieve this required resolution, the present invention discloses a novel approach that can reliably detect the minute amount of the thermal expansion information. The key element is a hybrid loop where optical and electronic signals are seamlessly interlaced to form a continuous closed loop. The signal within the closed loop is regenerated through the AOEO regenerator. By precisely interrupting the regeneration process at a specific time $t_N$, the regenerated pulse $P_N$ would be equivalent to the effect that the first pulse $P_1$ recirculates in the fiber loop $l_1$ exactly by N times. To express it mathematically, the relation of the total delay time t to the effective optical path length $L_N$ can be regarded as multiplication of N to the original $L_1$ as follows.

$$\frac{dt}{dT} = \frac{d(t_N - t_1)}{dT} = \frac{N}{c}\frac{dL_1}{dT} \quad \text{(Equation 3)}$$

where c is the speed of light in vacuum. From Equation 2 and Equation 3, one can estimate that, to achieve the minimum resolution of $2.23\times10^{-4}$ m, N must be at least 336. In contrast, for the case of conventional time-of-flight measurement scheme, N=1, the resolution is approximately 0.07 m. In the present invention, the value of $N=10^5$ has been achieved, which is equivalent to the enhancement of optical length resolution to $1.5\times10^{-4}$ m. This result shows that the current invention can exceed the minimum requirement. The newly enhanced resolution is what makes it possible to adopt the reliable, albeit lacking fine resolution, time of flight detection scheme for more refined temperature sensing. As a result, it greatly lessens the performance requirements to the specifications of electronic components and makes it lower cost to manufacture. The above mentioned operation principle establishes the foundation for the present invention. The process flow chart of the operation of the fiber optic temperature sensor of FIG. 1 is shown in FIG. 2. To begin the measurement, at step 205 the first pulse signal is initiated by the MCU turning on the seed laser LD1 to generate the first pulse. Next, at step 225 the 2×2 3 dB splitter 225 splits the first pulse into two optical output signals. At step 230, the first optical output signal is received by the first photodetector PD1 and converted into first analog electronic signal and amplified. After signal amplification, at step 235 it is then converted to first digital signal by the A/D. At step 240, the arriving time of the first digital signal is subsequently processed by MCU and saved as initial arriving time to data. At step 245, the second optical output signal from the 3 dB splitter is received by the second photodetector that is inside the AOEO and converted into the second analog electronic signal. At step 250, the second analog electronic signal is used to drive the second laser diode to regenerate a new optical pulse with an identical timing as the original optical input. At step 255 the regenerated optical pulse is sent into the sensing fiber and coupled back to the second input of the 2×2 3 dB splitter. Now the second optical pulse is to be repeated by the regeneration process described in steps 245, 250, and 255 to become the third optical pulse. This regeneration process is self-feeding and may continue to repeat to the $N^{th}$ regenerated optical pulse where N is precalculated as explained previously. At the beginning, when the initial pulse is started by the MCU at step 205, it also starts the counting of the time elapse by a combination of internal clock and a delay line. At decision 215 a check is made to see if the $N^{th}$ counter/time is reached. If it has been reached, at step 220 the MCU turns on the disable pin of the AOEO to stop the second laser inside the AOEO. The regeneration process would stop precisely at the $N^{th}$ time. At which point, the first photodetector at step 230 receives the $N^{th}$ optical pulse. The $N^{th}$ optical pulse is converted to $N^{th}$ digital signal by the A/D at step 235. At step 240, the $N^{th}$ digital signal is processed with precise arriving time IN information and compared to the first pulse arriving time $t_0$. The difference of the $N^{th}$ arriving time and the first arriving time, $t_0$, is equivalent to multiplication of the time of flight inside the sensing fiber length by N times, which effectively increases the sensitivity of the fiber length variation measurement by N times as desired. Based on the apparatus configured as illustrated in FIG. 1, better than 0.1° C. sensitivity has been achieved.

Figure 3:
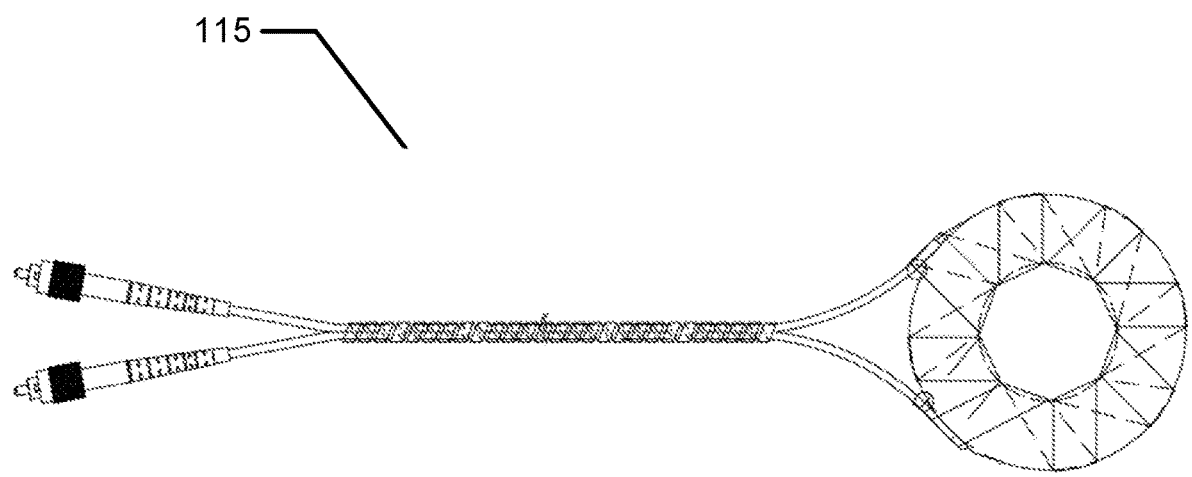
FIG. 3 is a temperature sensing optical fiber in the shape of a coil, in accordance with some embodiments.

In some embodiments, the design of the optical fiber temperature sensing probe 115 comprises a length of optical fiber. The length can be customized depending on particular requirements, i.e. temperature range and desired sensitivity. One example of the length is 50 m. The fiber can be wound into a coil with a particular diameter and thickness. The optical fiber may comprise commercially available single mode or multimode fiber or plastic fiber, for example Corning® SMF-28® fiber. A schematic illustration of a temperature sensing fiber coil is shown in FIG. 3. If smaller coil diameter is desired, the optical fiber may comprise reduced diameter fiber type, for example Fibercore® SM1500 (5.3/80)P. The fiber coil diameter can be less than 10 cm and as small as 40 mm. More examples of optical fibers can be sourced from other fiber suppliers.

Figure 4:
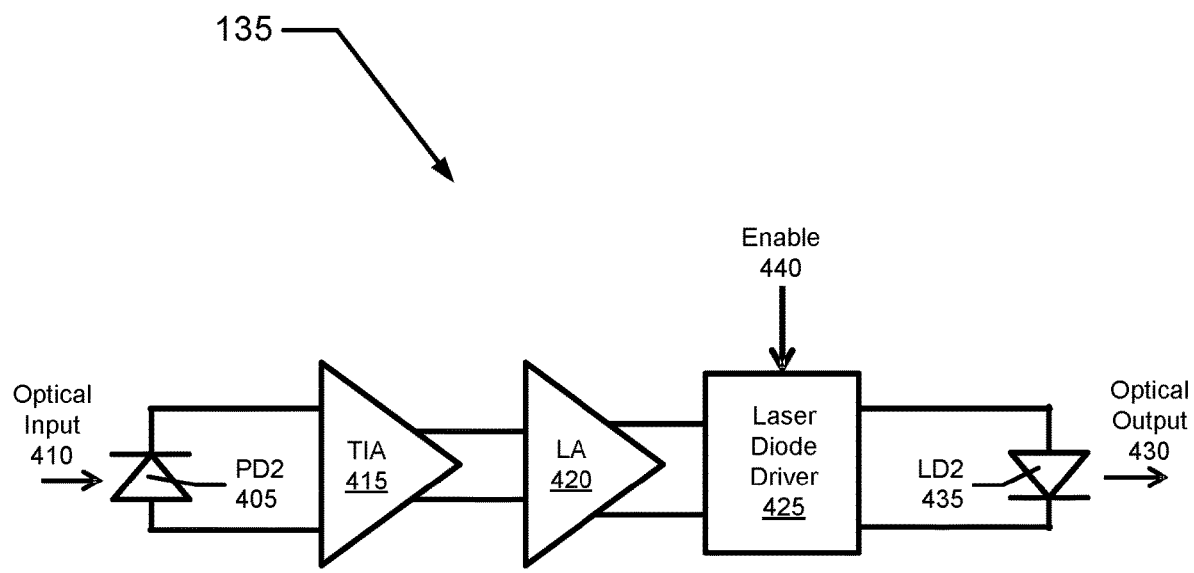
FIG. 4 is a schematic of the analog optical-electrical-optical (AOEO) regenerator of FIG. 1, in accordance with some embodiments.
Figure 5:
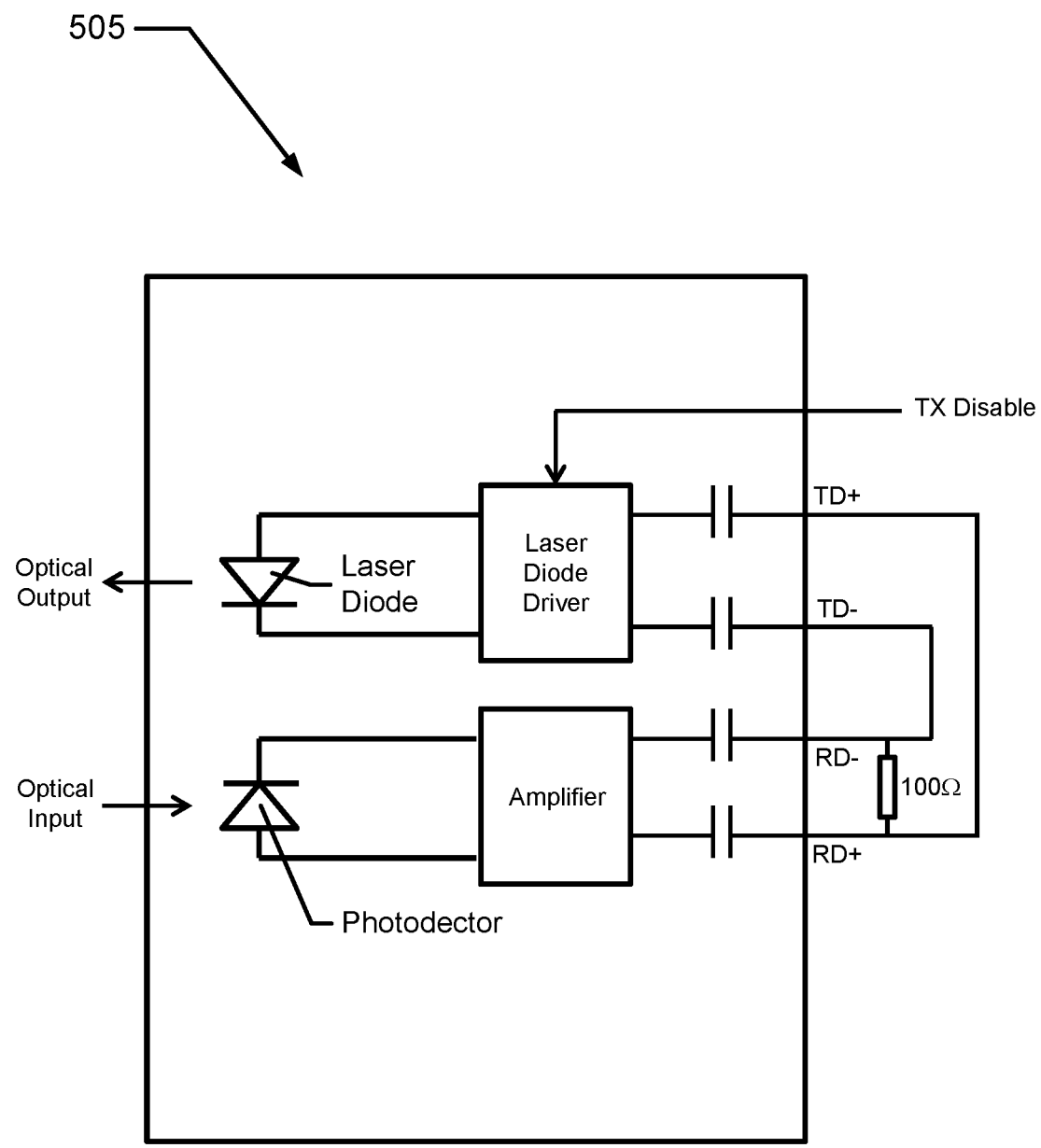
FIG. 5 is a schematic of an SFP transceiver module reconfigured as the AOEO regenerator of FIG. 1, in accordance with some embodiments.

In some embodiments, the fiber optic based temperature sensor 100 illustrated in FIG. 1 may be realized by numerous possible hardware combination from a wide selection of commercially available components. In some embodiments, the LD1 and PD1 can be sourced from Thorlabs® (www.thorlabs.com) (e.g. LPS-1550-FC and DET01CFC, respectively), the laser diode driver from iC-Haus (www.icHaus.com) (e.g. ic-HB), the A/D semiconductor chip from Texas Instruments® (www.ti.com) (e.g. ADC34J45), and microcontroller from Microchip® (www.atmel.com) (e.g. SAM3X). The implementation of the AOEO can have many different schematic configurations. The core of the AOEO 135, as illustrated in FIG. 4 is a photodetector PD2 405 which receives the optical signal 410 from one of the optical fibers 143 from the 2×2 3 dB fiber coupler, and through a signal amplification circuit comprising a transimpedance amplifier (TIA) 415 and a limiting amplifier (LA) 420, the optical signal gets converted to an electronic signal while preserving the timing information of the original optical signal with minimum delay and jitter, and subsequently through a laser diode driver 425, the electronic signal is converted to an optical signal 430 again by the laser diode LD2 435. The time-interruptible AOEO function can be implemented when the signal is at the electronic stage. The enable pin 440 of the laser diode driver, which controls the on/off of the laser diode LD2 and/or the limiting amplifier 420, may be connected to the microcontroller unit 165 in a timing triggered by a time delay chip 155. In some embodiments, the timer 155 comprises a hardware semiconductor chip such as offered by Analog Devices® (www.analog.com) (e.g. DS1124). In an alternative embodiment, the timer 155 comprises a software timer, which can be handled by the MCU, to control the delay time. In such an embodiment, the timer 155 may not be required and the enablement and disablement of the AOEO is directly controlled by the MCU. In an alternate embodiment as illustrated in FIG. 5, the AOEO may comprise a small form-factor pluggable (SFP) transceiver 505 which comes with a pre-manufactured pair of transmitter (acting as LD2) and receiver (acting as PD2), and a built-in transmitter disable pin that can be activated or deactivated by the microcontroller unit with proper timing control. The SFP transceiver information is available in the datasheets. An example of the SFP transceiver can be sourced from Coherent (www.ii-vi.com) (e.g. FTLF1318P3BTL). The SFP transceiver can be configured as shown in FIG. 5 as a simplified version of the AOEO regenerator.

Figure 6:
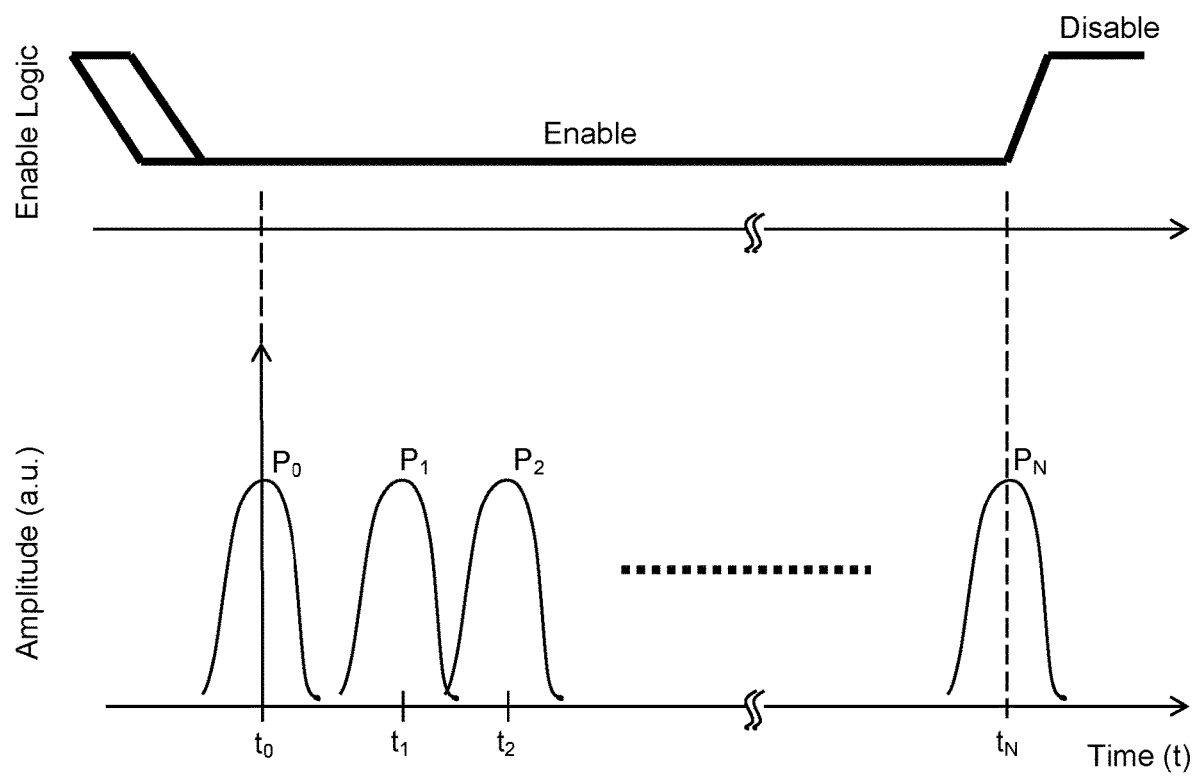
FIG. 6 is an illustration of pulses and their respective timing with the Enable pin function, in accordance with some embodiments.
Figure 7:
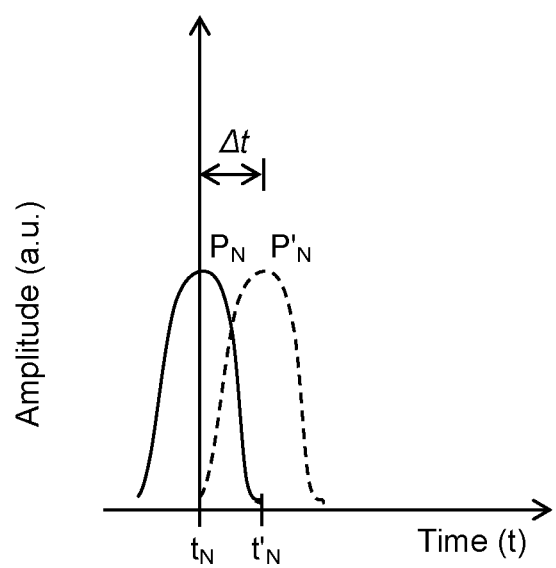
FIG. 7 is a graph of the temperature induced shift in pulse $P_N$ and its timing $t_N$, in accordance with some embodiments.

The time interruptible AOEO regenerator makes it possible to regenerate the optical signal inside the loop L1 and to stop the regeneration at a given time. The signals received by PD1 are illustrated in FIG. 6 where each pulse $P_i$ (i=0, 1 ... N) is received and can be processed at a specific time $t_i$ (i=0, 1 ... N). When the sensing fiber 115 is subject to temperature exposure, the signal pulse $P_N$ would experience a slightly expanded fiber length and change its time of arrival from $t_N$ to $t'_N$. The difference in time of arrival $\Delta t = (t'_N - t_N)$ between $P_N$ and $P'_N$ can be visualized as shown in FIG. 7, from which the temperature change $\Delta T$ based on Equation 3 can be obtained as follows:

$$\Delta T = \frac{c}{n\alpha + \frac{dn}{dT}} \frac{\Delta t}{N l_1} \quad \text{(Equation 4)}$$

Figure 8:
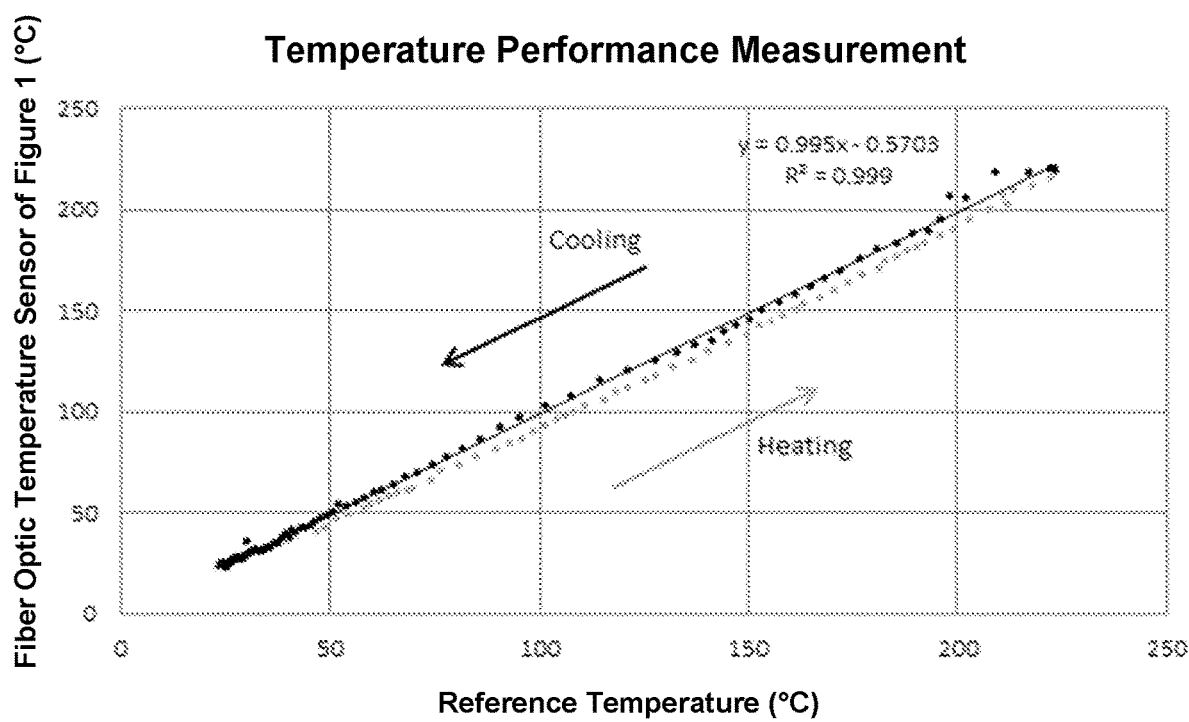
FIG. 8 is a graph of the measured temperatures from the fiber optic temperature sensor of FIG. 1 from 20° C. to 225° C., in accordance with some embodiments.

Equation 4 establishes the relation between the change in time of arrival to the temperature change of the fiber. The arrival time in the actual implementation is analyzed by the microcontroller unit in the following process. We first establish the baseline $t_N$ accurately at a reference temperature (e.g. room temperature), the temperature variation as sensed by the sensing fiber can be determined from Equation 4 as soon as a new time $t'_N$ ($\Delta t = t'_N - t_N$) is detected. An example of the testing results, from 20° C. to 225° C., based on the present invention is shown in FIG. 8. The results were taken under the condition that the fiber loop length was 60 m, the sensing fiber length was 50 m, and the ambient environment was at room temperature. It showed that the present invention measured the temperature from 20° C. to 225° C. with good linearity and accuracy (+/−3° C.).

For industrial applications, the ambient environment may be quite volatile, for example inside a heated equipment or exposed to severe weather, which may impact the measurement accuracy. It is, therefore, important to mitigate the adverse influence from more severe variations of ambient temperature in order to improve the measurement accuracy. Let us take a closer look at the configuration as shown in FIG. 1, the first fiber loop length $l_1$ is composed of two distinctive segments: the fiber sensing probe length $l_s$ and the accumulative rest of fiber lengths $l_r$, which includes the fibers connecting between the AOEO 135 to the sensing fiber 115, the sensing fiber 115 to the 3 dB coupler 130, the coupler 130 to the AOEO 135, and the coupler 130 to PD1 125. That is $l_1 = l_s + l_r$. As shown in the results in FIG. 7, it is possible to minimize the error induced by ambient temperature to $l_r$ by choosing $l_s \gg l_r$. In other applications where $l_r$ may be comparable to $l_s$, the ambient temperature effect is no longer negligible and must be mitigated. Let us begin the discussion with the separation of both time delays: $\Delta t_s$ from the sensing fiber $l_s$ in the target temperature environment $T_s$ and $\Delta t_r$ from the lead fibers in ambient temperature $T_a$. The total delay $\Delta t$ can be obtained as shown in Equation 5 where $\Delta t_s$ is the delay experienced by the sensing fiber and $\Delta t_r$ the ambient contribution from the connecting fibers.

$$\Delta t = \Delta t_s + \Delta t_r = \left(\frac{n\alpha + \frac{dn}{dT}}{c}\right) N(l_s \Delta T_s + l_r \Delta T_a) \quad \text{(Equation 5)}$$

From Equation (5), the additional parameters $l_s$, $l_r$, and $\Delta T_a$ need to be determined accurately before the object temperature $\Delta T_s$ can be obtained. The length of $l_s$ and $l_r$ can be determined by the actual length measurement to the fibers. However, $\Delta T_a$ must be determined in situ from the field environment. This problem may be solved by the following two scenarios in field applications. The first one is when the application is in a relatively uniform ambient environment, for example in laboratories, $\Delta t_r$ can be estimated externally by referencing from an ambient thermometer which measures temperature as $T_a$. It follows a linear relation expressed in Equation 6:

$$\Delta t_r \approx k(T_a) \Delta T_a = k(T_a)(T_a - T_0) \quad \text{(Equation 6)}$$

where $k(T_a)$ is an experimentally calibrated coefficient from actual ambient temperature testing and $T_0$ is the reference temperature, i.e. room temperature. From Equation 5, using the indirect method, we can obtain the object sensing temperature $\Delta T_s$ that:

$$\Delta T_s = \frac{c}{\left(n\alpha + \frac{dn}{dT}\right) N l_s} [\Delta t - k(T_a) \Delta T_a] \quad \text{(Equation 7)}$$

In a more complex application scenario, however, when the device is subject to severe environment where there might be multiple sections in different temperature zones as seen in typical industrial applications, $\Delta T_a$ in Equation 5 needs to reflect complex ambient environment profiles with multiple terms and different temperatures. An improved tracking to the ambient temperatures becomes necessary. For this scenario, the fiber optic based temperature sensor comprises a dual-loop differential (DLD) method where a second fiber loop $l_2$ is introduced adjacent to the first loop $l_1$. The length $l_2$ can be a suitable length of choosing as long as it serves the purpose of closely tracking the environment of that of the first loop $l_1$ and thus the lengths of loop $l_1$ and loop $l_2$ do not need to be equal. Considering that these two loops are closely placed adjacent to one another, they would have the almost identical influence from the ambient. The information from the second loop is used as the background. By subtracting the second loop information from the first loop information, one can obtain the true sensing information and completely mitigate the influence from the ambient environment. To express it mathematically, the temperature information in the second fiber loop, Equation 4 can be rewritten as follows.

$$\Delta t|_{T_{a2}} = \frac{n\alpha + \frac{dn}{dT}}{c} N_2 l_2 \Delta T_{a2} \quad \text{(Equation 8)}$$

where the subscript "2" denotes the parameters associated with the second loop. Since both loops are experiencing the same ambient environment, it can be assumed that $\Delta T_a = \Delta T_{a2}$. By substituting Equation 8 into Equation 5 and using the DLD method, the object temperature $\Delta T_s$ can be derived as follows:

$$\Delta T_s = \frac{c}{n\alpha + \frac{dn}{dT}} \frac{l_r}{l_s} \left( \frac{\Delta t}{Nl_r} - \frac{\Delta t|_{T_{a2}}}{N_2 l_2} \right) \quad \text{(Equation 9)}$$

By comparing Equation 5 and Equation 9, if the condition $Nl_r = N_2 l_2$ is maintained, the ambient temperature effect can be completely eliminated. In a simplified example, setting $N_2 = N$ and $l_2 = l_r$, Equation 9 is reduced to:

$$\Delta T_s = \frac{c}{\left(n\alpha + \frac{dn}{dT}\right)N} \left( \frac{\Delta t}{l_s} - \frac{\Delta t|_{T_{a2}}}{l_2} \right) \quad \text{(Equation 10)}$$

Figure 9:
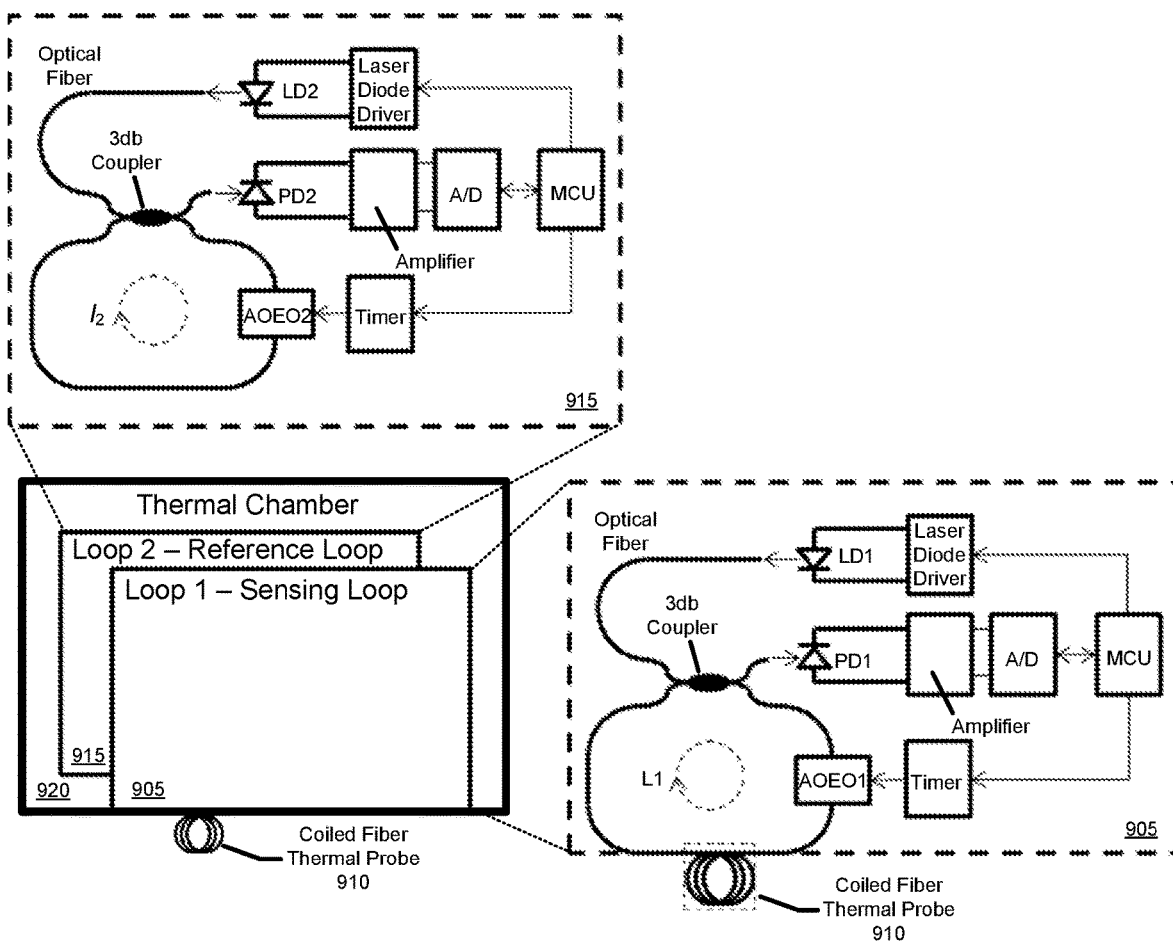
FIG. 9 is a schematic illustration of a second loop placed adjacent to the first loop to collect ambient temperature data, in accordance with some embodiments.
Figure 10B:
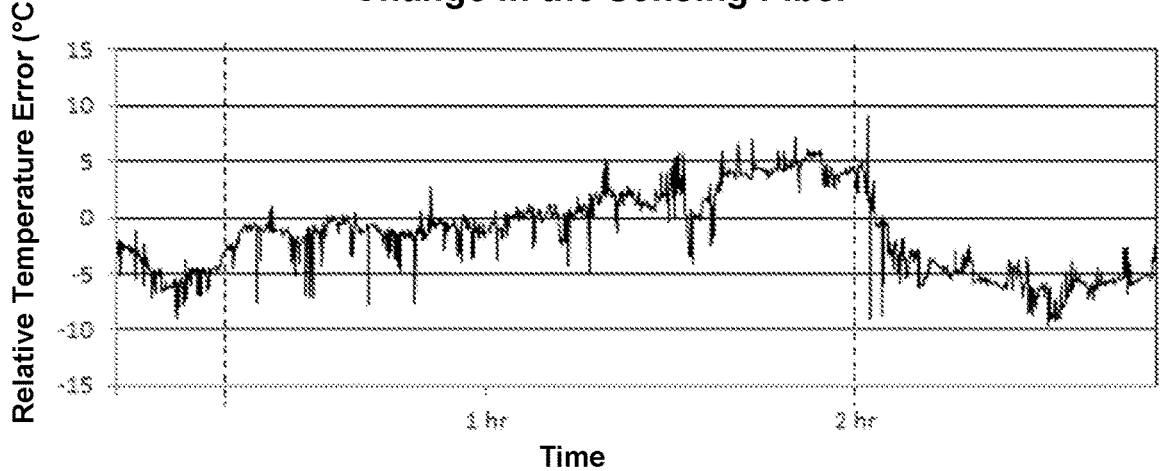

In the actual implementation, the configuration in FIG. 1 forms the first loop (sensing loop) with the sensing fiber coil thermal probe. When ambient temperature compensation is needed, one has the choice of employing the indirect method as dictated in Equation 7 by a way of employing an ambient sensing thermometer, or the dual-loop differential method as introduced by Equation 9 by using the second loop (reference loop), or any combination of both methods. The dual-loop fiber optic temperature sensor apparatus with ambient temperature cancellation performance is illustrated in FIG. 9. The apparatus comprises a first loop 905 $L_1$ with $l_1$=80 m (of which the sensing fiber coil thermal probe 910 has a length of $l_s$=50 m) and a second reference loop 915 with $l_2$=50 m to collect ambient temperature information. The second loop is placed adjacent to the first loop. The communication between the first loop and the second reference loop may be in a format of UART, I2C, SPI, USB, and the like, which are well known in the art for their suitability for communication links between components. To demonstrate the effectiveness of the ambient temperature cancellation, a simulated application was created where the sensing fiber coil 910 was placed on a target with known and relatively stable temperature, e.g. at room temperature, and the rest of the fibers of Loop 1 905 ($l_r$=$l_1$−$l_s$) and the second reference loop 915 $l_2$ were placed inside a thermal chamber 920 to mimic the ambient temperature variation in a controlled environment. The thermal chamber was set to change from 0° C. to 70° C. in a period of two hours. Temperature measurements were taken concurrently in both loops. In this experimental case, the temperature measurement is expected to be flat as the sensing fiber should reflect the targeted stable room temperature within the given short testing time period despite the severe ambient temperature disturbance of the thermal chamber. The results are shown in FIGS. 10A and B, where FIG. 10A shows the actual temperature change profile inside the thermal chamber over the testing time period and FIG. 10B shows the measured relative target temperature change in the sensing fiber after the cancellation from the ambient temperature disturbance. The results show that the mitigation of the ambient disturbance may be achieved to less than ±10° C. error even at the extreme ambient temperature range of 70° C. in the worst-case scenario. The error would be much less under less extreme temperature ranges. This inaccuracy is acceptable in many industrial applications where the fiber sensor can measure up to 400° C. The optimum compensation may be achieved by implementing the condition of Equation 10 where $N_2$=N and $l_2$=$l_r$. Having been verified that severe ambient temperature disturbance can be mitigated based on the formula in Equation 9, the present invention satisfies the requirements of accurate temperature measurement of an object in certain applications that the thermal probe must be electrically non-conductive and immune to strong electro-magnetic interference.

FIG. 11 is a schematic of a fiber optic temperature sensor with integrated AOEO, in accordance with some embodiments.

In an alternate embodiment of the fiber optic based temperature sensor of FIG. 1 as illustrated in FIG. 11, the fiber optic based temperature sensor 1100 comprises two functional portions: one optical 1105 and the other electrical 1110 and configured to interact with each other. In the fiber optic based temperature sensor of FIG. 11, the seed laser and the first photodetector are combined and integrated with the AOEO electronically such that only one laser LD1 1120 is used as both the seed laser and the regenerative laser, and only one photodetector PD1 1125 is used as both the first photodetector and the second photodetector. The 3 db coupler is no longer needed in this embodiment as its function is replaced by similar functions in electronic circuits. The integrated configuration illustrated in FIG. 11 is possible because of the multiplexing technique used to combine both seed laser LD1 120 of FIG. 1 and regenerative laser LD2 435 of FIG. 4. The initial optical pulse generated at time to from LD1 1120 gets launched directly into the sensing loop L1 1170, passes though the optical fiber 1140 having the coiled fiber thermal probe 1115, and received by the photodetector PD1 1125 where the optical signal is converted into an electronic signal and amplified by a transimpedance amplifier 1150 and limiting amplifier 1151 at time $t_1$. The amplification of the limiting amplifier is such that the received analog electronic signal from the transimpedance amplifier gets quantized into digital ready signal format which is ready to be processed directly by the microcontroller. With such a configuration, at the output of the limiting amplifier, a 1:2 splitter 1152 is inserted to split the electronic signal into two paths: one which is directly processed by MCU 1165 without the need of an A/D chip; the other which is looped back to the LD1 driver 1145, which creates a regenerated pulsed at $t_1$ to reach the completion of the first cycle of the loop. In the integrated AOEO configuration of FIG. 11, the natural delay induced from the sensing fiber length acts as a signal multiplexer in time. It creates the same sequence of pulses as explained in FIG. 6. By utilizing the time multiplexing technique at the laser diode driver side and 1:2 splitter at the photodetector side, the need for the second pair of laser LD2 and photodetector PD2 is eliminated, resulting in a further simplified design with reduced cost. The 1:2 splitter 1152 can be a simple Y or T-branch in a circuit. For the regenerative function, the integrated AOEO is enabled/disabled via digital logic applied to the limiting amplifier controlled by the microcontroller unit 1165.

FIG. 12 is a schematic of a fiber optic temperature sensor with integrated AOEO and reflecting mode fiber sensor, in accordance with some embodiments.

In an alternate embodiment of the fiber optic based temperature sensor of FIG. 11 as illustrated in FIG. 12, the fiber optic based temperature sensor 1200 comprises the fiber coil 1215 having one input 1216 and output 1217 end. In this case, the original fiber loop is opened up by a 3-port 3 db coupler 1231. The first port 1232 and second port 1233 are connected to the sensing loop L1 1270 as shown. The input 1216 of the fiber coil is connected to the third port 1234 of the 3 db coupler and the other end of the fiber coil is terminated by a reflective mirror 1218. The optical signal reflected by the mirror passes through the fiber coil twice and back to the third port of the 3 db coupler. In order to prevent back reflection from the mirror, an isolator 1219 may be added between the laser and 3 db coupler. The advantage of the embodiment illustrated in FIG. 12 is that it reduces the fiber probe length by half, which reduces the size of the fiber coil by half, resulting in further cost reduction. In addition, the fiber probe is now capable of being accessed through just one end of the coiled fiber thermal probe, which may be important in certain critical applications, such as in a vacuum chamber where having fewer connections may be crucial. The electrical portion of the fiber optic based temperature sensor illustrated in FIG. 12 is the same as that of the embodiment illustrated in FIG. 11.

FIG. 13 is a schematic of a fiber optic temperature sensor with integrated AOEO and reflecting mode fiber sensor, in accordance with some embodiments.

In an alternate embodiment of the fiber optic based temperature sensor of FIG. 12 as illustrated in FIG. 13, the 3 db coupler is replaced with an optical circulator 1331. In this embodiment, an isolator is not needed. The rest of the optical and electrical portions of the fiber optic based temperature sensor illustrated in FIG. 13 are the same as that of the embodiment illustrated in FIG. 12. The optical circulator reduces the insertion loss from 6 dB to 2 dB as compared to the 3 db coupler, which effectively improves the dynamic range of the apparatus by 4 dB.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention as detailed within the following claims.

The invention claimed is:

1. A fiber optic based temperature sensor comprising a sensing loop, the sensing loop comprising:
   a seed laser diode configured to generate an initial optical pulse;
   a laser diode driver coupled to the seed laser diode and configured to drive the seed laser diode;
   a 3 db coupler having a first input, a second input, a first output, and a second output, wherein the seed laser diode is optically coupled to the first input of the 3 db coupler;
   a first photodetector optically coupled to the first output of the 3 db coupler and configured to detect a first half of an optical output from the 3 db coupler and produce a current based on the detected first half of the optical output from the 3 db coupler;
   an amplifier coupled to the first photodetector and configured to convert and amplify the current to an output voltage;
   an A/D converter coupled to the amplifier and configured to convert the output voltage to a digital signal;
   an analog optical-to-electrical-to-optical (AOEO) regenerator comprising:
      an optical input having a second photodetector;
      an optical output having a second laser diode;
      wherein the optical input of the AOEO is optically coupled to the second output of the 3 db coupler,
      wherein the AOEO is configured to convert a second half of the optical output from the 3 db coupler to an electronic signal while preserving timing information of the second half of the optical output from the 3 db coupler, and
      wherein the AOEO is configured to convert the electronic signal to a regenerated optical signal at the optical output;
   a timer coupled to the AOEO and configured to control a delay time of the AOEO by timely interrupting the electronic signal;
   an optical fiber probe comprising a length of optical fiber having an optical input and an optical output, wherein the optical input of the optical fiber probe is optically coupled to the optical output of the AOEO and wherein the optical output of the optical fiber probe is optically coupled to the second input of the 3 db coupler; and
   a microcontroller coupled to the laser diode driver, the A/D converter, and the timer;
   wherein the microcontroller is configured to control timing of the first optical signal and the delay time of the AOEO triggered by the timer;
   wherein the microcontroller is configured to process the digital signal to determine a temperature change, and
   wherein the sensitivity of the fiber optic based temperature sensor increases with an increase in the length of optical fiber of the optical fiber probe and/or an increase in the number of times the regenerated optical signal is generated.

2. The apparatus of claim 1, wherein the regenerated optical signal is generated at least 336 times.

3. The apparatus of claim 1, wherein the AOEO comprises a SFP transceiver having a transmitter disable pin, wherein the transmitter disable pin is controlled by the timer.

4. The apparatus of claim 1, wherein the optical fiber probe comprises a coil having a diameter less than 10 cm.

5. The apparatus of claim 1, further comprising an external reference thermometer, wherein the external reference thermometer is used to aid compensation of ambient temperature variation of the sensing loop.

6. The apparatus of claim 1, further comprising a reference loop, the reference loop comprising:
  a reference loop seed laser diode to generate an initial reference optical pulse;
  a reference loop laser diode driver coupled to the reference loop seed laser diode and configured to drive the reference loop seed laser diode;
  a reference loop 3 db coupler having a reference loop first input, a reference loop second input, a reference loop first output, and a reference loop second output, wherein the reference loop seed laser diode is optically coupled to the reference loop first input of the reference loop 3 db coupler;
  a first reference loop photodetector optically coupled to the reference loop first output of the reference loop 3 db coupler and configured to detect a reference loop first half of a reference loop optical output from the reference loop 3 db coupler and produce a reference loop current based on the detected reference loop first half of the optical output from the reference loop 3 db coupler;
  a reference loop amplifier coupled to the reference loop first photodetector and configured to convert and amplify the reference loop current to a reference loop output voltage;
  a reference loop A/D converter coupled to the reference loop amplifier and configured to convert the reference loop output voltage to a reference loop digital signal;
  a reference loop AOEO regenerator comprising:
    a reference loop optical input having a second reference loop photodetector;
    a reference loop optical output having a second reference loop laser diode;
    wherein the reference loop optical input of the reference loop AOEO is optically coupled to the reference loop second output of the reference loop 3 db coupler;
    wherein the reference loop optical output of the reference loop AOEO is optically coupled with a reference loop length of reference loop optical fiber to the reference loop second input of the reference loop 3 db coupler;
    wherein the reference loop AOEO is configured to convert a reference loop second half of the reference loop optical output from the reference loop 3 db coupler to a reference loop electronic signal while preserving timing information of the reference loop second half of the reference loop optical output from the reference loop 3 db coupler; and
    wherein the reference loop AOEO is configured to convert the reference loop electronic signal to a reference loop regenerated loop optical signal at the reference loop optical output;
  a reference loop timer coupled to the reference loop AOEO and configured to control a reference loop delay time of the reference loop AOEO by interrupting the reference loop electronic signal; and
  a reference loop microcontroller coupled to the reference loop laser diode driver, the reference loop A/D converter, and the reference loop timer;
  wherein the reference loop microcontroller is configured to control timing of the reference loop first optical signal and the reference loop delay time of the reference loop AOEO,
  wherein the reference loop microcontroller is configured to process the reference loop digital signal to determine a reference loop temperature change,
  wherein the reference loop temperature change is used to compensate for ambient temperature effects, and
  wherein the reference loop and the sensing loop are in close proximity.

7. The apparatus of claim 6, wherein the reference loop regenerated optical signal is generated at least 336 times.

8. The apparatus of claim 6, wherein the reference loop AOEO comprises a reference loop SFP transceiver having a reference loop transmitter disable pin, wherein the reference loop transmitter disable pin is controlled by the reference loop timer.

9. A fiber optic based temperature sensor comprising a sensing loop, the sensing loop comprising:
  an optical portion comprising a length of optical fiber having an optical input and an optical output; and
  an electrical portion, wherein the electrical portion comprises:
    a laser diode, the laser diode configured to:
      generate an initial optical pulse and subsequent regenerated optical pulses and launch the initial optical pulse and subsequent regenerated optical pulses into the optical input of the optical portion;
    a laser diode driver coupled to the laser diode, the laser diode driver configured to drive the laser diode;
    a photodetector, the photodetector configured to:
      detect the initial optical pulse and the subsequently regenerated optical pulses which pass through the optical portion and out the optical output of the optical portion and
      produce an electronic signal based on the detected initial optical pulse and subsequently regenerated optical pulses;
    a transimpedance amplifier coupled to the photodetector, the transimpedance amplifier configured to amplify the electronic signal;
    a limiting amplifier coupled to the transimpedance amplifier, the limiting amplifier configured to further amplify the electronic signal;
    a 1:2 splitter coupled to the limiting amplifier, the 1:2 splitter configured to split the further amplified electronic signal into a first output and a second output; and
    a microcontroller coupled to the second output of the 1:2 splitter, the laser diode driver, and the limiting amplifier, the microcontroller configured to:
      process the further amplified electronic signal from the second output of the 1:2 splitter to a digital signal to determine a temperature change;
      enable and disable the laser diode driver; and
      enable and disable the further amplification of the electronic signal;
  wherein the further amplified electronic signal from the first output of the 1:2 splitter is sent to the laser diode driver so subsequent optical pulses may be regenerated by the laser diode; and
  wherein the sensitivity of the fiber optic based temperature sensor increases with an increase of the optical fiber length and/or in the number of times the regenerated optical pulses are generated.

10. The apparatus of claim 9, wherein the regenerated optical pulse is generated at least 336 times.

11. The apparatus of claim 9, wherein the optical portion comprises an optical fiber thermal probe comprising an optical input and an optical output, wherein the optical input of the optical fiber thermal probe is optically coupled to the optical input of the optical portion opposite the laser diode and wherein the optical output of the optical fiber thermal probe is optically coupled to the optical output of the optical portion opposite the photodetector.

12. The apparatus of claim 11, wherein the optical fiber thermal probe comprises a coil having a diameter less than 10 cm.

13. The apparatus of claim 9, wherein the optical portion comprises:
   an isolator having an optical input and an optical output, wherein the optical input of the isolator is optically coupled to the optical input of the optical portion opposite the laser diode;
   a 3 db coupler having an input port, an input/output port, and an output port, wherein the input port of the 3 db coupler is optically coupled to the optical output of the isolator and
   wherein the output port of the 3 db coupler is optically coupled to the optical output of the optical portion opposite the photodetector;
   an optical fiber thermal probe comprising an optical input and an optical output, wherein the optical input of the optical fiber thermal probe is optically coupled to the input/output port of the 3 db coupler; and
   a reflective mirror coupled to the optical output of the optical fiber thermal probe, wherein the reflective mirror is configured to reflect the initial optical pulse and the subsequent regenerated optical pulses back through the optical fiber thermal probe.

14. The apparatus of claim 13, wherein the optical fiber thermal probe comprises a coil having a diameter less than 10 cm.

15. The apparatus of claim 9, wherein the optical portion comprises:
   a circulator having a first port, a second port, and a third port, wherein the first port of the circulator is optically coupled to the optical input of the optical portion opposite the laser diode and wherein the second port of the circulator is optically coupled to the optical output of the optical portion opposite the photodetector;
   an optical fiber thermal probe comprising an optical input and an optical output, wherein the optical input of the optical fiber thermal probe is optically coupled to the third port of the circulator; and
   a reflective mirror coupled to the optical output of the optical fiber thermal probe, wherein the reflective mirror is configured to reflect the initial optical pulse and the subsequent regenerated optical pulses back through the optical fiber thermal probe.

16. The apparatus of claim 15, wherein the optical fiber thermal probe comprises a coil having a diameter less than 10 cm.

17. The apparatus of claim 9, further comprising a reference loop, the reference loop comprising:
   a reference loop optical portion comprising a reference loop length of optical fiber having a reference loop optical input and a reference loop optical output; and
   a reference loop electrical portion, wherein the reference loop electrical portion comprises:
      a reference loop laser diode, the reference loop laser diode configured to:
         generate a reference loop initial optical pulse and subsequent reference loop regenerated optical pulses and
         launch the reference loop initial optical pulse and subsequent reference loop regenerated optical pulses into the reference loop optical input of the reference loop optical portion;
      a reference loop laser diode driver coupled to the reference loop laser diode, the reference loop laser diode driver configured to drive the reference loop laser diode;
      a reference loop photodetector, the reference loop photodetector configured to:
         detect the reference loop initial optical pulse and the subsequent reference loop regenerated optical pulses which pass through the reference loop optical portion and out the reference loop optical output of the reference loop optical portion and produce a reference loop electronic signal based on the detected reference loop initial optical pulse and subsequent reference loop regenerated optical pulses;
      a reference loop transimpedance amplifier coupled to the reference loop photodetector, the reference loop transimpedance amplifier configured to amplify the reference loop electronic signal;
      a reference loop limiting amplifier coupled to the reference loop transimpedance amplifier, the reference loop limiting amplifier configured to further amplify the reference loop electronic signal;
      a reference loop 1:2 splitter coupled to the reference loop limiting amplifier, the reference loop 1:2 splitter configured to split the further amplified reference loop electronic signal into a first reference loop output and a second reference loop output; and
      a reference loop microcontroller coupled to the reference loop second output of the reference loop 1:2 splitter, the reference loop laser diode driver, and the reference loop limiting amplifier, the reference loop microcontroller configured to:
         process the further amplified reference loop electronic signal from the reference loop second output of the reference loop 1:2 splitter to a reference loop digital signal to determine a reference loop temperature change;
         enable and disable the reference loop laser diode driver; and
         enable and disable the further amplification of the reference loop electronic signal;
   wherein the further amplified reference loop electronic signal from the first reference loop output of the reference loop 1:2 splitter is sent to the reference loop laser diode driver so subsequent reference loop optical pulses may be regenerated by the reference loop laser diode; and
   wherein the reference loop microcontroller is configured to process the reference loop digital signal to determine a reference loop temperature change,
   wherein the reference loop temperature change is used to compensate for ambient temperature effects, and
   wherein the reference loop and the sensing loop are in close proximity.

18. The apparatus of claim 17, wherein the reference loop regenerated optical pulse is generated at least 336 times.

19. The apparatus of claim 9, further comprising an external reference thermometer, wherein the external reference thermometer is used to compensate for ambient temperature effects.

* * * * *